United States Patent [19]

Riester

[11] 4,389,747
[45] Jun. 28, 1983

[54] WINDSHIELD WIPER BLADE REFILL UNIT

[75] Inventor: William C. Riester, Williamsville, N.Y.

[73] Assignee: Trico Products Corporation, Buffalo, N.Y.

[21] Appl. No.: 291,385

[22] Filed: Aug. 10, 1981

[51] Int. Cl.³ .............................................. B60S 1/38
[52] U.S. Cl. ............................................... 15/250.42
[58] Field of Search ........................ 15/250.36–250.42

[56] References Cited

U.S. PATENT DOCUMENTS

| 3,795,935 | 3/1974 | Roberts | 15/250.42 |
| 3,798,703 | 3/1974 | Den Berg et al. | 15/250.42 |
| 3,952,360 | 4/1976 | Plisky et al. | 15/250.42 |
| 4,180,885 | 1/1980 | Thornton et al. | 15/250.42 |

OTHER PUBLICATIONS

Fram Corporation, Providence, R.I., Carton for Wiper Blade Refills and Copy Machine Copy of Actual Fram Refil Element.

Primary Examiner—Peter Feldman
Attorney, Agent, or Firm—E. Herbert Liss

[57] ABSTRACT

The anchoring strip of an elastomeric squeegee element is retained within the body portion of a plastic supporting strip; the supporting strip includes laterally open channels which slidably engage opposed sets of claws of a superstructure; a plurality of pairs of spaced apart openings extend through the web of one channel in alignment with corresponding pairs of openings in the web of the other channel and corresponding notches in the anchoring strip. The pairs of openings and notches are spaced apart from like parts along the length of the refill unit so that at least one pair of opposed claws of diverse types of superstructures will fall between pairs of openings when the superstructure is substantially centered upon the refill unit. A U-shaped clip embraces a claw and its legs pass through the pairs of corresponding openings and notches and are detachably retained. Indicia is provided to guide in centering the superstructure on the backing strip. Longitudinally spaced laterally broadened areas are provided to accomodate superstructures having wider distances beween opposed claws.

11 Claims, 6 Drawing Figures

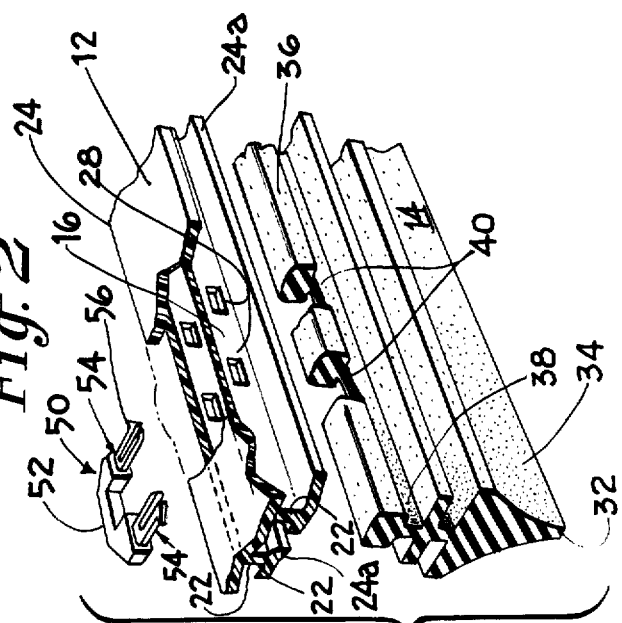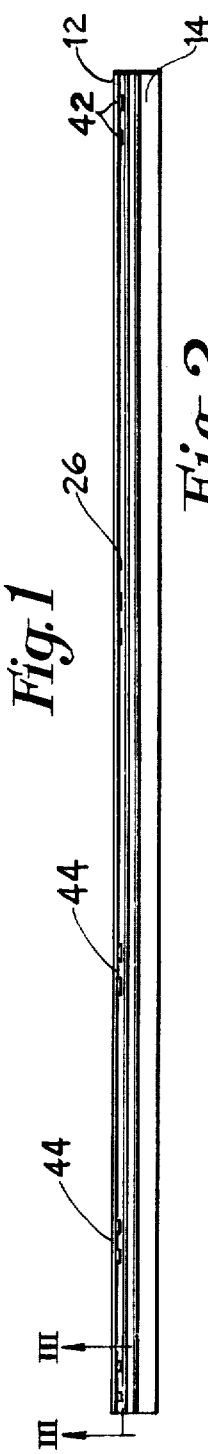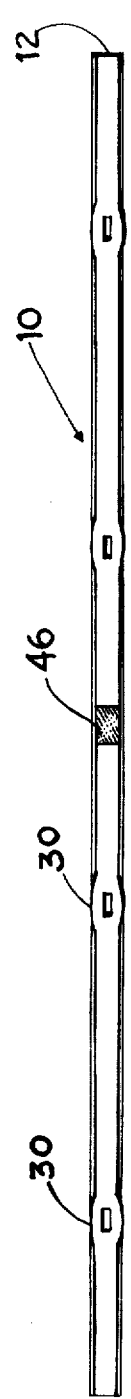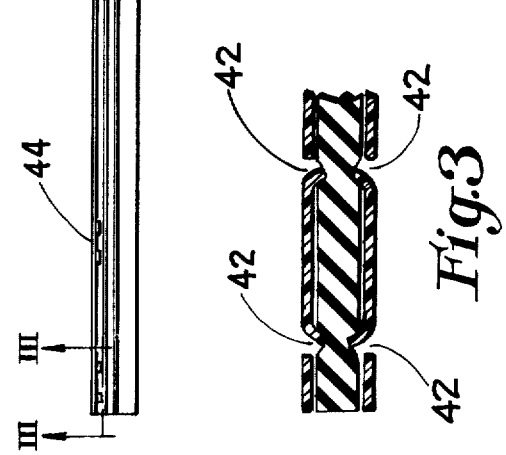

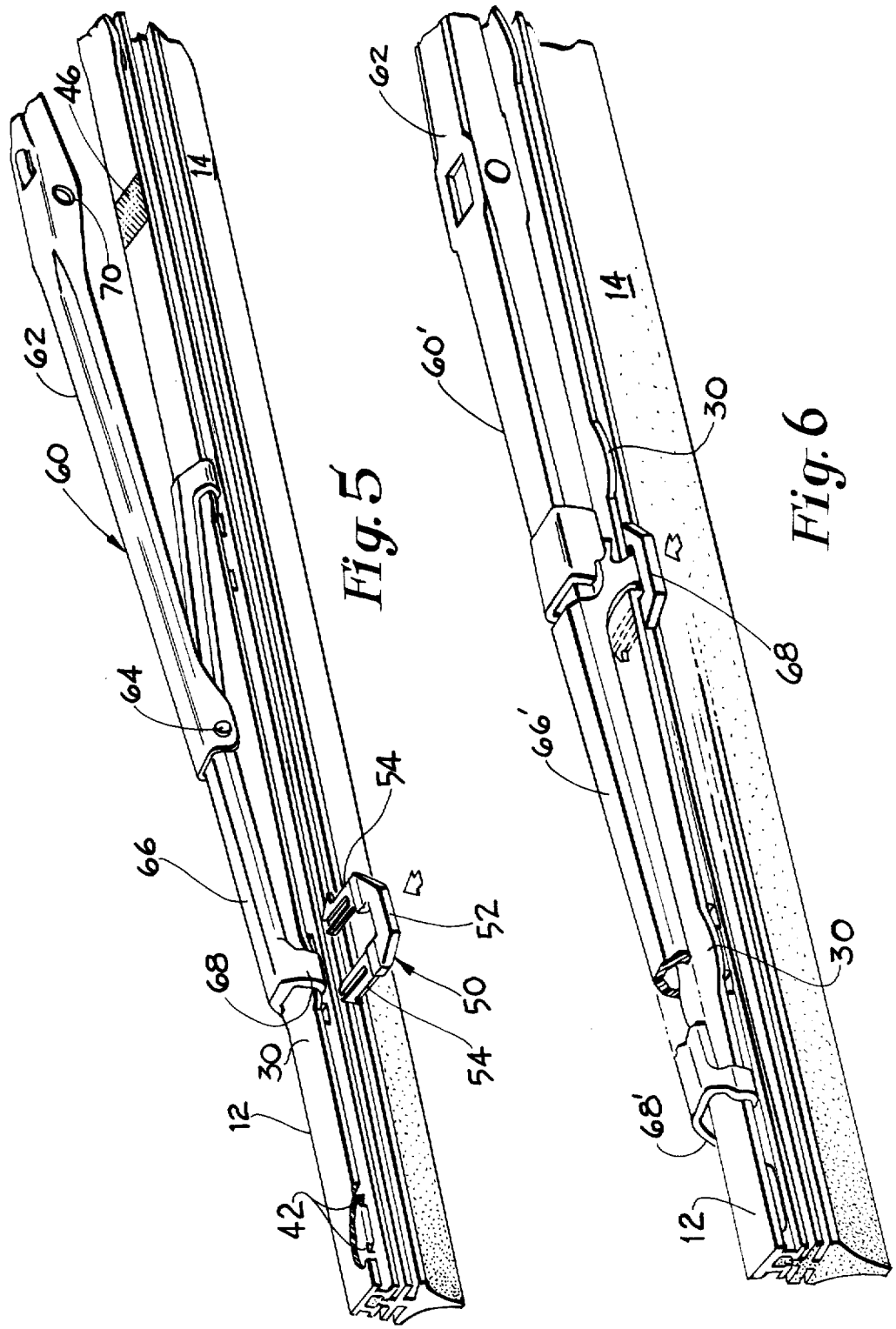

WINDSHIELD WIPER BLADE REFILL UNIT

BACKGROUND OF THE INVENTION

The present invention relates to refill units for windshield wiper blades and, more particularly, to improvements in retaining the refill unit in assembly with the superstructure to allow accomodation to diverse types of superstructures.

Among the several known designs for retaining refill units in assembly with windshield wiper blade superstructures are end clips similar to that shown in U.S. Pat. No. 3,153,254 to Lenz et al issued Oct. 26, 1964; claw embracing notched rails as shown in U.S. Pat. No. 3,141,186 to Scinta issued July 21, 1964; deflection of superstructure to align notch in rail of refill for removal or installation as shown in U.S. Pat. No. 3,408,680 to Heller issued Nov. 5, 1968. More relevant to the present invention are the claw embracing clips shown in U.S. Pat. No. 3,952,360 to Plisky et al issued Apr. 27, 1976 and a clip illustrated on the Fram Corporation, Providence, R.I. carton for wiper blade refills.

These prior art refill retaining elements and others which have been proposed and used are either designed for a specific superstructure or require the stocking of several different types of refills to accomodate the many different superstructures currently in use. The refill unit is an expendible element which can be replaced when the squeegee element is worn out without having to replace the entire windshield wiper blade. Superstructures vary from full length extending over substantially the full length of the blade to short in which the ends of the refill unit extend substantially beyond the inboard and outboard claws. There are triple yoke type, stacked lever and end to end levers. The pairs of opposed claws may be laterally and longitudinally spaced apart different distances. There are plastic and metal superstructures. Therefore the advantage of a universal refill that can accomodate all or at least most of the different superstructures now in use is readily apparent.

SUMMARY OF THE INVENTION

The unique refill unit retaining means of the present invention can be accomodated in most if not all of the superstructures currently in use. A plastic supporting strip retains the elastomeric wiping element and includes a plurality of longitudinally spaced sets of transverse openings through laterally open channels; the channels slidably receive the claws. The sets of openings are positioned so that a pair of openings of at least one set is positioned to straddle a claw of one of the pairs of opposed claws of the superstructure when the refill is centered therein. A U-shaped clip having legs extending through the openings of a pair embraces the claw in such a way as to retain the refill element yet permit the requisite limited sliding motion; its legs project through the openings and are detachably retained therein. The rail upon which the claws slide includes longitudinally spaced broadened areas which are located to accomodate the more widely spaced apart opposed claws. The narrower opposed spaced claws can slide past the broadened areas because of the resiliency of the plastic material.

The principle object of the present invention is to provide a universal refill unit for windshield wiper blades which is of relatively simple construction and effective to retain the superstructure and refill unit in assembly and which can accommodate a wide variety of diverse superstructures.

Another object of the present invention is to provide an improved universal refill element for windshield wiper blades which accomodates superstructures having pairs of opposed claws spaced apart different distances transversely and longitudinally.

Other objects and advantages of the invention will be apparent from the following detailed description taken in connection with the accompanying drawings.

BRIEF DESCRIPTION OF THE DRAWINGS

FIG. 1 is a top elevation view of the refill unit of this invention;

FIG. 2 is a side elevation view of the refill unit of the invention;

FIG. 3 is a fragmentary section taken on line III—III of FIG. 2;

FIG. 4 is a fragmentary exploded perspective view;

FIG. 5 is a partial perspective illustrating the invention with the clip about to be inserted; and FIG. 6 is a view similar to FIG. 5 illustrating use in a second type of superstructure with the clip in place.

DETAILED DESCRIPTION OF THE INVENTION

Referring now to the drawings, there is illustrated in FIGS. 1 to 4 a refill unit 10 which includes a backing strip or supporting strip 12 of semi-rigid material which supports an elastomeric squeegee element 14. The supporting strip 12 comprises an elongate hollow body 16, an upper wall 18, a slotted bottom wall 20 and depending side walls 22. The upper wall 18 includes laterally extending coplanar flanges 24 and the lower wall includes laterally extending coplanar flanges 24a. The upper and lower flanges 24, 24a together with the depending side walls 22 form a laterally open channel 26 on each side of the supporting strip 12. Longitudinally spaced apart pairs of openings 28 extend through side walls 22. Each opening 28 of each pair of one side wall 22 is in transverse alignment with a corresponding pair on the other side wall 22. The upper flanges 24 are laterally bulged as at 30 to provide broadened areas longitudinally spaced along the upper flanges 24.

The squeegee element 14 includes a wiping lip 32 along one longitudinal edge, a body portion 34 and an anchoring strip 36 along the opposite elongate longitudinal edge. A narrow neck portion 38 extends longitudinally between the anchoring strip and the body portion 34. The anchoring strip 36 includes pairs of notched out portions 40. The squeegee element 14 and supporting strip 12 are assembled by sliding the anchoring strip into the hollow body 16, the neck portion 38 being slidably received in the slot of the bottom wall 20. The squeegee element 12 may be retained in assembled position with the supporting strip 12 in any suitable manner as, for example, by a set of crimps 42 at each end as illustrated (FIG. 3). In assembled condition the pairs of notches 40 and corresponding pairs of openings 28 in the depending side walls 22 are in alignment and constitute sets of openings 44. There are a plurality of sets of openings spaced longitudinally along the refill unit for a purpose to be explained hereinafter. On the upper wall 18 there is provided indicia at 46 indicating the longitudinal center of the refill unit.

A U-shaped clip 50 is provided having a base portion 52 and a pair of resilient legs 54. The resilient legs 54 are spaced apart a distance equal to the distance between the openings 28 of a pair of openings and the legs 54 are of a length sufficient to extend through a set of openings 44. Each leg 54 is bifurcated, one bifurcation including a rearwardly facing shoulder 56; a tapered portion inclines from the shoulder to the free end thereof. The bifurcated legs facilitate entry into the sets of openings 44 and provide support to resiliently retain the clip within the openings and to prevent inadvertent removal.

The sets of openings 44 are longitudinally positioned relative to each other so that at least one set will straddle a claw of any currently available superstructure when the refill is centered on the superstructure. Referring to FIG. 5 there is shown a refill in operative position on a triple yoke type superstructure 60 having a central yoke 66, its end centrally pivoted as at 64 on a secondary yoke 66. There is a secondary yoke 66 at each end of the central yoke 62, only one end being shown in the drawings. In this example the superstructure is of the short type with relatively wide claws. To assemble the refill unit on the superstructure 60 upper flanges 24 are slid between the pairs of opposed claws 68 of the superstructure 60 with the claws engaging in the laterally open channel 24. The superstructure 60 is centered on the refill unit 12 by aligning the indicia 46 with the transverse arm to blade connecting opening 70. It should be noted that for this type of structure, having widely spaced apart claws 68, the bulges 30 are positioned to engage the claws 68; one set of claws 68 falls between a pair of spaced openings. The legs 54 of the clip 50 are then passed through that set of openings 44; the clip 50 embraces the claw 68. As the legs 54 pass through the set of openings 44 the bifurcated legs 54 are compressed to facilitate entry by engagement of the tapered end with the sidewalls of the openings. When the legs 54 pass completely through the set of openings and the shoulder extends laterally outward the compression is relieved and the resiliency of the legs cause the shoulder 56 to engage the depending side wall 22 adjacent the opening to retain the clip 50 in position. The legs 54 and the spacing between the opening 44 are such that the refill is effectively retained on the superstructure with sufficient clearance to permit the requisite limited longitudinal sliding movement. The refill may be removed by compressing the resilient bifurcated legs 54 of the clip 50 and drawing the clip 50 outwardly whereupon the refill unit 12 can be slid out from between the claws 68 of the superstructure.

In FIG. 6 there is shown the same refill unit used with a different type of superstructure 60' which includes a central lever 62' and levers 66' pivotally connected end to end with the central lever 62. There is a lever 66' at each end, only one end of the blade being shown. In this case narrower claws 68' are provided, spaced at different intervals than the claws 68 shown in FIG. 5. In this example an inwardly set of claws 68' falls between a pair of openings 28', the claws lie in position displaced from the bulges 30. Assembly and disassembly is accomplished in the same manner as that described for FIG. 5.

It will be noted that the sets of openings 44 are so spaced that at least one set will straddle a claw of a pair of opposed claws 68 in various types of known superstructures. The bulges 30 are positioned longitudinally spaced apart to accomodate those superstructures having opposed claws more widely spaced. Refill units can be applied to superstructures with narrower claws since there is sufficient resiliency in the supporting strip material to permit the narrower claws to pass by the bulges to positions where the requisite limited sliding movement can occur. The arrangement of the sets of openings 44 is such that a multitude of different types of superstructures can be accomodated.

It will be apparent that a unique refill unit has been provided which is simple to install and remove yet provides positive and effective retention and which is capable of use with any number of different types of superstructures. In the event that types of superstructures with claws of different longitudinal and/or lateral spacing become available it requires only a simple manufacturing change to adapt the same refill element to accomodate any newly distributed types of superstructures.

Although a certain specific embodiment of the invention has been shown and described for the purpose of illustration it will be apparent that in accordance with the broader aspects of the invention various modifications and other embodiments are possible within the scope of the invention. For example other and different types of means may be employed to retain the clip in position. Other and different types of materials may be employed and different configurations of squeegee elements may be used. It is, therefore, to be understood that the invention is not limited to the specific arrangement shown but in its broadest aspects it includes all equivalent embodiments and modifications which come within the scope of the invention.

What is claimed is:

1. In a windshield wiper blade refill unit, including a squeegee element of elastomeric material having an elongate body portion terminating in a lip along one longitudinal edge and an anchoring strip along the other longitudinal edge separated from said body portion by a reduced neck portion and a stiff resilient supporting strip longitudinally coextensive with said squeegee element, said supporting strip including a hollow body for slidably receiving said anchoring strip having an upper wall, depending side walls and longitudinally slotted bottom wall for slidably receiving said neck portion, upper and lower lateral flanges coplanar with said upper and bottom walls, respectively, defining laterally open channels for slidably receiving and confining opposed claws of a wiper blade superstructure; retaining means for holding said superstructure and said refill unit assembled characterized in that each of said side walls include a plurality of sets of openings longitudinally spaced apart along the supporting strip, each set comprising a pair of spaced apart openings in alignment with a like pair of spaced apart openings in the opposite side wall, and notches in said anchoring strip in alignment with said openings, said clip comprising a base portion and a pair of resilient legs extending forwardly from said base, said clip embracing a claw of a superstructure, said legs extending completely through a set of said openings and releasable latching means on said legs for retaining said clip in said openings to thereby accomodate superstructures having claws at different longitudinal positions relative to the supporting strip.

2. In a windshield wiper blade refill unit; retaining means according to claim 1, characterized in that said upper wall of said supporting strip and upper coplanar lateral flanges include longitudinally spaced apart laterally broadened areas to accomodate superstructures having opposed claws spaced apart a distance greater than other superstructures.

3. In a windshield wiper blade refill unit; retaining means according to claim 1, characterized in that at least one pair of spaced openings of a set of openings is positioned to straddle a claw of said superstructure, when said superstructure is centered upon said refill unit.

4. In a windshield wiper blade refill unit; retaining means according to claim 3, characterized in that said plurality of sets of openings are each positioned to accomodate a different type of blade superstructure, each type having different longitudinal positioning of the claws relative to the refill unit.

5. In a windshield wiper blade refill unit; retaining means according to claim 3, characterized in that indicia is provided at the lateral center of said supporting strip for centering said refill unit relative to the superstructure.

6. In a windshield wiper blade refill unit; retaining means according to claim 1 characterized in that said pair of resilient legs each include a rearwardly facing shoulder which engages a depending side wall adjacent the edge of an opening.

7. In a windshield wiper blade refill unit; retaining means according to claim 6, characterized in that each of said resilient legs tapers inwardly from said shoulder toward the free end thereof.

8. In a windshield wiper blade refill unit; retaining means according to claim 7, characterized in that each of said resilient legs is bifurcated.

9. In a windshield wiper blade refill unit; retaining means according to claim 8, characterized in that said plurality of sets of openings are each positioned to accomodate different types of blade superstructures, each type having different longitudinal positioning of the claws relative to the refill unit, at least one pair of spaced openings of a set of openings being positioned to straddle a claw of a superstructure when said superstructure is centered upon said refill unit, said upper wall of said supporting strip, including longitudinally spaced apart laterally broadened areas to accomodate superstructures having claws spaced apart a distance greater than the distance between the outer edges of the upper coplanar lateral flanges.

10. In a windshield wiper blade refill unit; retaining means according to claim 9 characterized in that indicia is provided at the lateral center of said supporting strip for centering said refill unit relative to the superstructure.

11. In a windshield wiper blade refill unit, including a squeegee element of elastomeric material having an elongate body portion terminating in a lip along one longitudinal edge and an anchoring strip along the other longitudinal edge separated from said body portion by a reduced neck portion and a stiff resilient supporting strip longitudinally coextensive with said squeegee element, said supporting strip including a hollow body for slidably receiving said anchoring strip having an upper wall, depending side walls and longitudinally slotted bottom wall for slidably receiving said neck portion, upper and lower lateral flanges coplanar with said upper and bottom walls, respectively, defining laterally open channels for slidably receiving and confining opposed claws of a wiper blade superstructure; retaining means for holding said superstructure and said refill unit assembled characterized in that said upper wall of said supporting strip and upper coplanar lateral flanges include longitudinally spaced apart laterally broadened areas to accomodate superstructures having opposed claws spaced apart a distance greater than other superstructures.

* * * * *